Jan. 13, 1925.

B. H. HOWARD ET AL 1,523,213

FEEDER FOR INGOT MOLDS

Filed Dec. 1, 1924

Inventors
B. H. Howard
E. J. Turner
By C. R. Wright, Jr. Attorney

Patented Jan. 13, 1925.

1,523,213

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed December 1, 1924. Serial No. 753,160.

*To all whom it may concern:*

Be it known that we, BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder for ingot molds in which sufficient material is provided at the upper end to retain the heat at the upper end of the mold and ingot, to prevent "piping" and also to reduce segregation to a minimum.

Another object of our invention is to provide a feeder of this character in which the upper end of the feeder is thickened to retain the heat and also to serve as supporting means for the feeder on the mold, and said thickened portion so constructed that the feeder is at all times rigidly supported on the feeder where the relative size of the feeder and mold vary greatly.

A further object of our invention is to provide a simple, cheap and effective feeder of this character having certain details of structure and combination of parts hereinafter more fully set forth.

Figure 1:
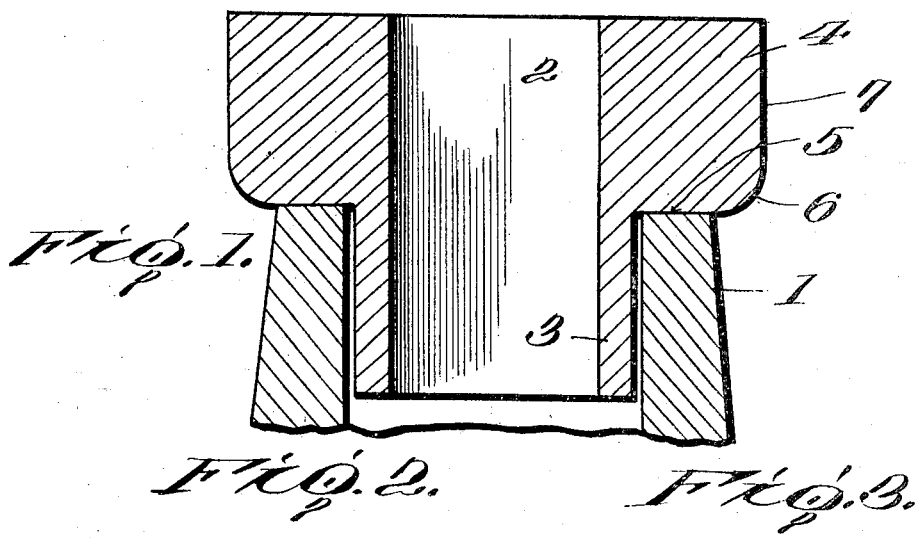
Figure 1 is a vertical sectional view of a mold showing our improved feeder applied thereto.

Referring now to the drawings, 1 represents the mold and 2 the feeder. The feeder 2 consists of a tubular body portion 3, having a thickened upper end 4, provided at its lower end with the horizontal surface 5, adapted to rest upon the upper end of the mold, whereby the feeder is rigidly supported on the mold. The horizontal surface 5 terminates at its outer end in the convex surface 6, which connects the horizontal surface 5 with the vertical wall 7 of the thickened portion.

By the above construction it will be seen that when the feeder and the mold are of the relative sizes shown in Figure 1 of the drawings the horizontal flat surface 5 rests upon the upper edge of the mold. Should the relative sizes of the feeder and the mold vary considerably the edge of the mold would engage the convex surface 6 and the feeder would be tightly held within the mold.

Figures 2, 3:
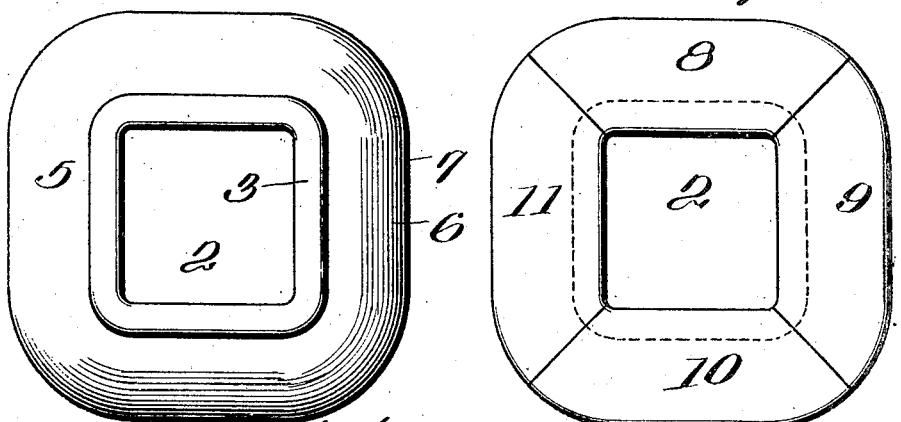
Figure 2 is a bottom plan view of the feeder shown in Figure 1.
Figure 3 is top plan view showing a sectional feeder constructed like that shown in Figure 1.

In the modification shown in Figure 3 of the drawings we have shown the feeder 2 made in four sections 8, 9, 10 and 11, and each section is provided with the thickened portion and connected with the horizontal wall, by the convex surface the same as that shown in Figure 1 of the drawings.

Figures 4, 5:
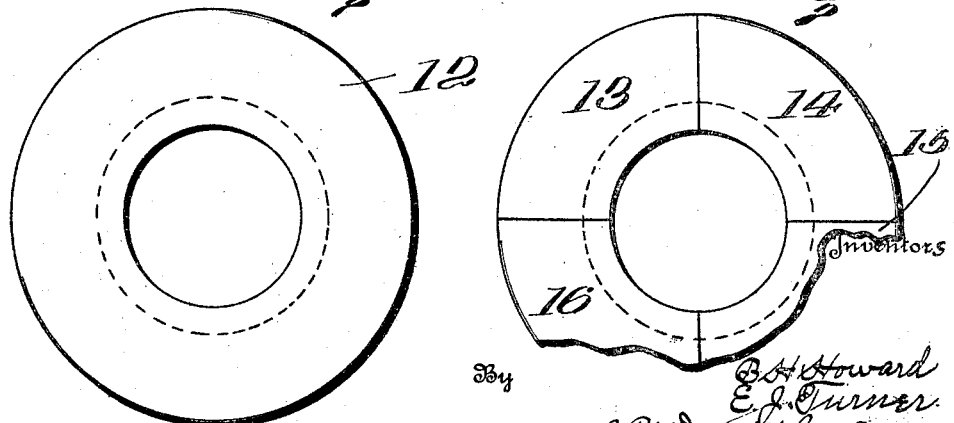
Figure 4 is a top plan view of a circular feeder embodying our invention.
Figure 5 is a top plan view of a circular sectional feeder.

In Figure 4 of the drawings we have shown a circular feeder 12 constructed exactly like that shown in Figure 1.

In Figure 5 we have shown a circular feeder made up of four sections 13, 14, 15 and 16 constructed according to the invention and a further description is not thought necessary.

Having thus fully described our invention what we claim is:

1. A feeder for ingot molds comprising a body portion having a thickened upper end provided with a horizontal surface terminating at its outer end in a convex surface.

2. A feeder for ingot molds comprising a tubular body portion having a thickened upper end provided at its lower end with a broad horizontal surface, said horizontal surface, connected to the vertical wall of the thickened portion by a convex surface.

3. A feeder for ingot molds comprising a body portion made of a series of sections, each section having a thickened upper end provided at their lower ends with broad horizontal surfaces terminating at their outer ends in convex surfaces.

4. A feeder for ingot molds comprising a body portion made of refractory material having a bore therethrough, and having a thickened upper portion, a relatively thin lower portion, the two portions being connected by a plain surface the outer portion of which is connected with the thickened portion by a curved surface, and which forms an angle with the inner portion.

5. A feeder for ingot molds comprising a body portion of refractory material and having a thickened portion, and a thinner portion having an angle at the junction of the two portions.

In testimony whereof we affix our signatures.

BLOOMFIELD H. HOWARD.
ERNEST J. TURNER.